Figure 1:
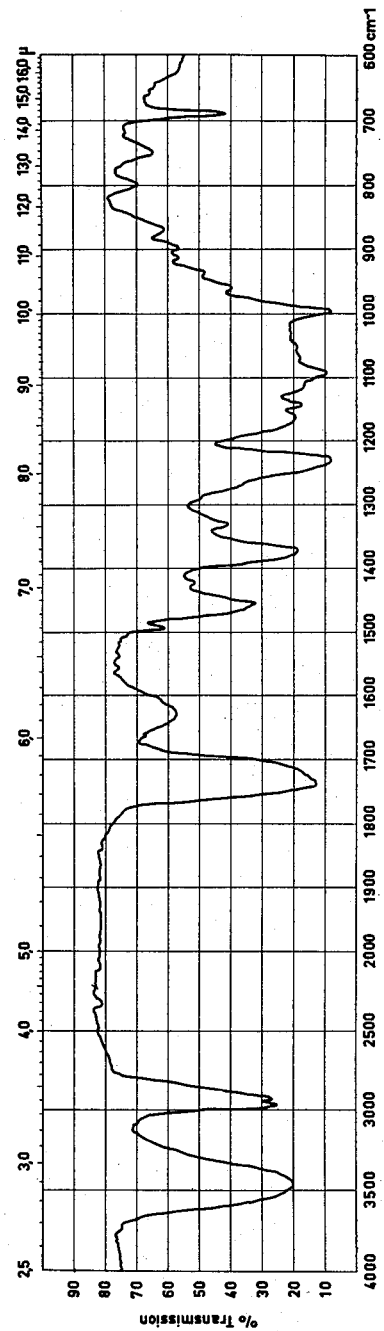

United States Patent Office 3,118,812
Patented Jan. 21, 1964

3,118,812
ANTIBIOTICS LANKAVAMYCIN AND LANKAVA-
CIDIN AND PROCESS OF PRODUCTION
Ernst Gaeumann and Vladimir Prelog, Zurich, and Ernst
Vischer, Basel, Switzerland, assignors to Ciba Corporation, New York, N.Y., a corporation of Delaware
Filed Apr. 5, 1962, Ser. No. 185,205
Claims priority, application Switzerland May 20, 1959
8 Claims. (Cl. 167—65)

This application is a continuation in part of our application Serial No. 28,790, filed May 12, 1960, now abandoned.

The present invention relates to two new antibiotics which are hereinafter referred to as lankavamycin and lankavacidin, mixtures thereof and also pharmaceutical preparations containing these compounds and mixtures, and to methods of preparing these substances and mixtures of substances.

The antibiotic lankavamycin and/or lankavacidin is produced on the cultivation of a new strain of the genus Streptomyces, which has been isolated from a soil sample collected in Ceylon and is kept at our laboratories and at the Federal Institute of Technology, Institute for Special Botany, Zurich, under the designation A 20388 and at the United States Department of Agriculture, Agricultural Research Service, Northern Utilization Research and Development Division, Peoria, Illinois, under the designation NRRL 2834.

Strain NRRL 2834 forms a cinnamon-brown air mycelium. The sphore chains are monopodially branched, with tight, closed spirals. The surface of the individual spores is smooth. When grown on nutrient substrata containing peptone, no melanoid discoloration is observed. Growth is relatively little dependent on temperature and the mould develops well both at 18° C. and at 40° C.

For the purpose of further characterization, the growth of strain NRRL 2834 on various nutrient media is described hereinafter. The nutrient media 1–7 and 10 were prepared as described by W. Lindenbein., Arch. Mikrobiol., vol. 17, page 361 (1952).

(1) Synthetic agar: Growth thin, cloud-like, pale yellow.
(2) Synthetic solution: Fine, pale-yellow clouding.
(3) Glucose-agar: Growth thin, cloud-like, pale yellow to light yellow.
(4) Glucose-asparagin-agar: Growth thin, cloud-like, light yellow; air mycelium velvety, chalk-white to cinnamon-brown.
(5) Calcium malate-agar: Growth thin, cloud-like, pale yellow; air mycelium sparse, mostly milk-white, cinnamon-brown in places.
(6) Gelatine stab cluture (18° C.): Growth sparse, thin, cloud-like, pale yellow to brownish yellow; liquefaction scanty, after 60 days 2 mm.
(7) Starch plate: Growth thin, cloud-like, pale yellow; no air mycelium; hydrolysis scanty, only a trace even after 10 days.
(8) Potatoes: Growth pustular to thin, cloud-like, brownish yellow; air mycelium velvety, initially snow-white to pale grey, later pale carmine and cinnamon-brown.
(9) Carrots: Growth sparse, pustular; air mycelium sparse, pale grey.
(10) Litmus milk: Annular growth and pustular surface growth, pale yellow; litmus reddish; very strong peptonization and strong coagulation.

In its essential features, such as color of air mycelium, morphology of the individual spores and of the spore chains and melanoid discoloration of nutrient substrata containing peptone, strain NRRL 2834 corresponds to *Streptomyces violaceo-niger* (Waksman and Curtis) and is therefore considered for the time being as belonging to this species. It is known that the antibiotic nigericin is produced by a strain of Streptomyces which also belongs to the species *Streptomyces violaceo-niger* (see Harned et al., Antibiotics and Chemotherapy, vol. 1, page 594 (1951)). Nigericin is an organic acid which can readily be titrated with alkali (equivalent weight 728). As shown hereunder, the new antibiotics lankavamycin and lankavacidin are neutral or phenolic substances, so that any identity with nigericin can be excluded.

As regards the manufacture of the antibiotics lankavamycin and lankavacidin the present invention is not limited to the use of organism NRRL 2834 or of other strains corresponding to the description, but also relates to the use of variants of these organisms such as are obtained, for example, by selection or mutation, in particular under the action of ultra-violet rays or X-rays or nitrogen mustard oils.

In order to produce lankavamycin and/or lankavacidin a strain of streptomycetes exhibiting the properties of organism NRRL 2834 is aerobically cultivated, for example, in an aqueous nutrient solution containing inorganic salts, a source of carbon and nitrogen and if required growth-promoting substances until the solution exhibits a substantial antibacterial action, and the antibiotic lankavamycin and/or lankavacidin is thereupon isolated.

As inorganic salts, the nutrient solution contains, for example, chlorides, nitrates, carbonates or sulfates of alkali metals, alkaline earth metals, magnesium, iron, zinc or manganese. As nitrogenous compounds and carbohydrates and growth-promoting substances to be added if required there may be mentioned, for example: aminoacids and mixtures thereof, peptides and proteins and their hydrolyzates, such as peptone or tryptone, meat extracts, water-soluble constituents of cereal grains, such as maize and wheat, of distillation residues in the manufacture of alcohol, of yeast, beans, especially of the soya bean plant, of seeds, for example of the cotton plant, and also glucose, saccharose, lactose, starch, mannitol, glycerine, etc.

The cultivation is carried out aerobically, thus, for example, in a quiescent surface culture or preferably immersed while being agitated or stirred with air or oxygen in a shaking bottle or a known fermenter. A suitable temperature is one between 18° C. and 40° C. The nutrient solution generally exhibits a substantial antibacterial action after 1½ to 5 days.

During this fermentation a mixture of lankavamycin and lankavacidin is generally formed. The proportion of the quantities produced of the two antibiotics can be influenced by suitable variation of the fermentation conditions. During fermentation a third, mould-active antibiotic is formed.

In order to isolate the antibiotic, the following methods may, for example, be used: The mycelium is separated from the culture filtrate, whereupon the bulk of the lankavamycin and/or lankavacidin is found in the culture filtrate. The mould-active substance remains adsorbed on the mycelium and can be extracted therefrom. Organic, at least partially water-soluble solvents, such as alcohols, for example methanol, ethanol and butanols, or ketones for example acetone and methylethyl ketone, are particularly suitable for this purpose. By treatment with ethyl acetate, for example, the mould-active substance can be isolated from these mycelium extracts in solid form. In the ultra-violet absorption spectrum, maxima are visible at the following wave lengths:

360 m$\mu$ (log $E_{1\ cm.}^{1\%}$=2.71), 342 m$\mu$ (log $E_{1\ cm.}^{1\%}$=2.73), 325 m$\mu$ (log $E_{1\ cm.}^{1\%}$=2.57) and 309 m$\mu$ (log $E_{1\ cm.}^{1\%}$=2.32)

This points to the fact that this substance is a pentaene.

To isolate lankavamycin and/or lankavacidin, the culture filtrate is extracted with an organic solvent immiscible with water, such as esters of lower fatty acids, for example ethyl acetate or amyl acetate, hydrocarbons, for example benzene, chlorinated hydrocarbons, for example ethylene chloride, methylene chloride or chloroform, ketones, for example methyl propyl ketone, methyl amyl ketone or diisobutyl ketone, alcohols, such as butyl alcohols or amyl alcohols, ethers, for example ethyl ether, diisopropyl ether, dibutyl ethers or glycol ethers and the like. Instead of extracting the cultures by means of a solvent, or in combination with such a method of extraction as a further purifying operation, it is also possible to obtain the antibiotics by adsorption, for example on active carbon or on activated earths, such as fuller's earth or floridin, and subsequent extraction of the adsorbate, for example by means of an organic solvent at least partially soluble in water, such as acetone, butanol or methylethyl ketone.

Further enrichment of lankavamycin and/or lankavacidin can be obtained by first extracting the organic extracts containing the antibiotic with an aqueous acid solution having a pH value of less than 5 and then repeatedly with an aqueous alkaline solution having a pH value of more than 8, the bulk of the antibacterial activity remaining in the organic phase, from which the above antibiotics are isolated.

As mentioned above, during fermentation of the strain NRRL 2834 mixtures of lankavamycin and/or lankavacidin are generally obtained. These substances can readily be isolated in homogeneous form by means of counter-current distribution. Two-phase solvent systems which consist of a mixture of chlorinated hydrocarbons, alcohols and water are especially suitable for this separation process. For example, a mixture of carbon tetrachloride, chloroform, methanol and water has proved to be satisfactory for this purpose.

A good method of purifying the two new antibiotics is constituted again by distribution between an alcoholic aqueous solution and a solvent immiscible with water. Advantageously, the distribution is carried out by the counter-current method in suitable apparatus. Chromatography, for instance on aluminum oxide, is also very suitable for purifying purposes. These methods of purification may be employed separately or in combination with one another.

The recovery of lankavamycin and pure lankavacidin in crystalline form is carried out, for example, from organic solvents, such as acetone, methanol, ethanol, acetic ester, chloroform, acetone-methanol mixtures, acetone-ether mixtures, acetone-petroleum ether mixtures or acetic-ester-petroleum ether mixtures. The same solvents are used for recrystallization or aqueous-organic solutions, such as dilute alcohols, dilute acetone, etc.

The antibiotic lankavamycin forms colorless crystals which show a double melting point at 147–150° C. and at 181–182° C., $[\alpha]_D^{20}$=−93.8° (c.=1.23, in ethanol). Elementary analysis gives the following values: C=60.18%, H=8.75%, O=31.06%, CH$_3$CO=11.49%, OCH$_3$=8.67%, (C)CH$_3$=20.54%. The ultra-violet absorption spectrum shows a maximum at 289 m$\mu$ (log $\epsilon$=1.50). In the infrared spectrum in potassium bromide (see FIG. 1), bands are visible inter alia at the following wave lengths: 2.88$\mu$, 3.36$\mu$, 3.40$\mu$, 5.73$\mu$, 6.12$\mu$, 6.68$\mu$, 6.87$\mu$, 7.02$\mu$, 7.27$\mu$, 7.49$\mu$, 8.12$\mu$, 8.58$\mu$, 8.73$\mu$, 9.12$\mu$, 9.32$\mu$, 9.45$\mu$, 9.98$\mu$, 10.28$\mu$, 10.65$\mu$, 10.88$\mu$, 11.08$\mu$, 11.45$\mu$, 12.47$\mu$, 13.30$\mu$ and 14.45$\mu$. The molecular weight in methylene chloride was found to be 899, in ethyl acetate 893. These data suggest the molecular formula $C_{43}H_{74}O_{17}$ which corresponds to the molecular weight 863. The substance is soluble, inter alia, in alcohol, acetone, chloroform, acetic ester, ether and benzene and only difficultly soluble in water and petroleum ether. Dissolved in acetone, it is resistant at room temperatures to potassium permanganate. On hydrolysis with 0.5-n. sulfuric acid at 100° C., a reducing sugar is split off and on treatment with alkali acetic acid is liberated. Lankavamycin gives with hydrochloric acid according to Fischbach and Levine [Antibiotics and Chemotherapy 3, 1159 (1953)] the same color reaction as the macrolide-antibiotic erythromycin. In addition it gives a deep blue color reaction according to Keller-Kiliani.

The antibiotic lankavacidin forms pale yellow crystals which melt at 165–168° C. and give a green color reaction with ferric chloride solution. Elementary analysis gives the following values: C=62.71%, H=7.11%, N=2.87%, (C)CH$_3$=12.60%. $[\alpha]_D^{20}$=−161° (c.= 0.967 in absolute ethanol). The molecular weight is 459, the molecular formula $C_{25}H_{33}O_7N$. The antibiotic is soluble, inter alia, in alcohol, acetone, chloroform and acetic ester and only moderately or difficultly soluble in petroleum ether and water.

The ultra-violet absorption spectrum shows a maximum at 227 m$\mu$ (log $E_{1\ cm.}^{1\%}$=2.95)

Figure 2:
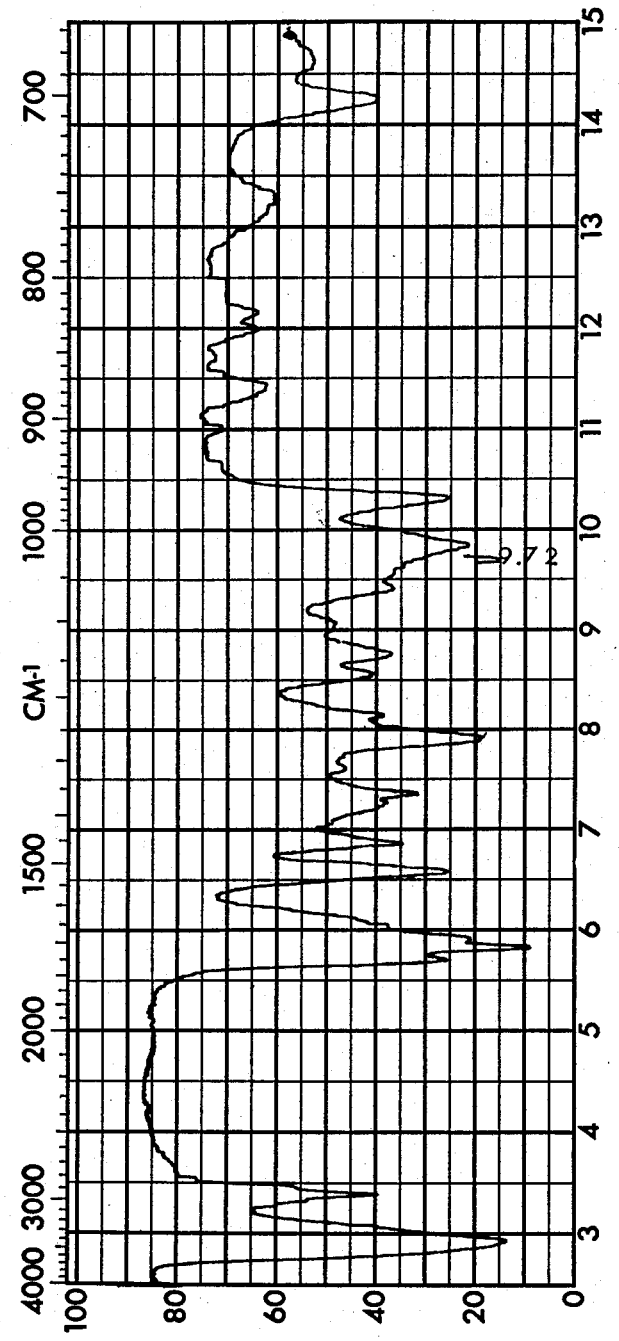

In the infra red spectrum in potassium bromide (see FIG. 2), bands are visible inter alia at the following wave lengths: 2.93$\mu$, 3.39$\mu$, 5.71$\mu$, 5.84$\mu$, 5.92$\mu$, 6.58$\mu$, 6.89$\mu$, 7.38$\mu$, 7.92$\mu$, 8.18$\mu$, 8.59$\mu$, 8.79$\mu$, 9.07$\mu$, 9.40$\mu$, 9.87$\mu$, 10.34$\mu$, 11.46$\mu$, 12.03$\mu$, 13.36$\mu$ and 14.31$\mu$. On hydrolysis with 6-n. hydrochloric acid at 110° C., no fission products are formed which give a color reaction with ninhydrin.

The antibiotics lankavamycin and lankavacidin and mixtures thereof have a very high antibiotic activity against various test organisms. If dilution series (tenth powers) in glucose broth, which are incubated for 24 hours at 37° C., are used as test method in vitro, the following checking concentrations are obtained:

| Test organisms | Checking concentration in $\mu$g. per cc. | |
|---|---|---|
| | Lankavamycin | Lankavacidin |
| Staphylococcus aureus | 100 | 100 |
| Streptococcus pyogenes | 100 | >100 |
| Streptococcus viridans | 100 | 10 |
| Corynebacterium diphtheriae | 100 | >100 |
| Bacillus megatherium | 100 | >100 |
| Ent. histolytica | 125 | 1000 |

*Escherichia coli, Salmonella typhosa, Salmonella schottmuelleri, Shigella sonnei, Pseudomonas aeruginosa, Klebsiella pneumoniae* (type A), *Pasteurella pestis, Vibrio comma* (El Tor), *Streptococcus faecalis,* and fungi such as *Candida albicans* and *Trichophyton interdigitale* are not inhibited by concentrations of 100$\mu$g./cc. of the two compounds.

As the table shows, lankavamycin and lankavacidin are chiefly active in vitro against gram-positive microorganisms. Lankavacidin shows in vivo a pronounced chemotherapeutic activity. Mice infected with *Streptococcus pyogenes* or *Staphylococcus aureus* survive 100% the tenth day of experiment if they are given a subcutaneous injection of 5 times 33 mg./kg. within 30 hours of being infected. The effective dose per os under the same conditions is 5 times 100 mg./kg. The tenfold dose of lankavamycin is only weakly effective or ineffective.

Figure 3:
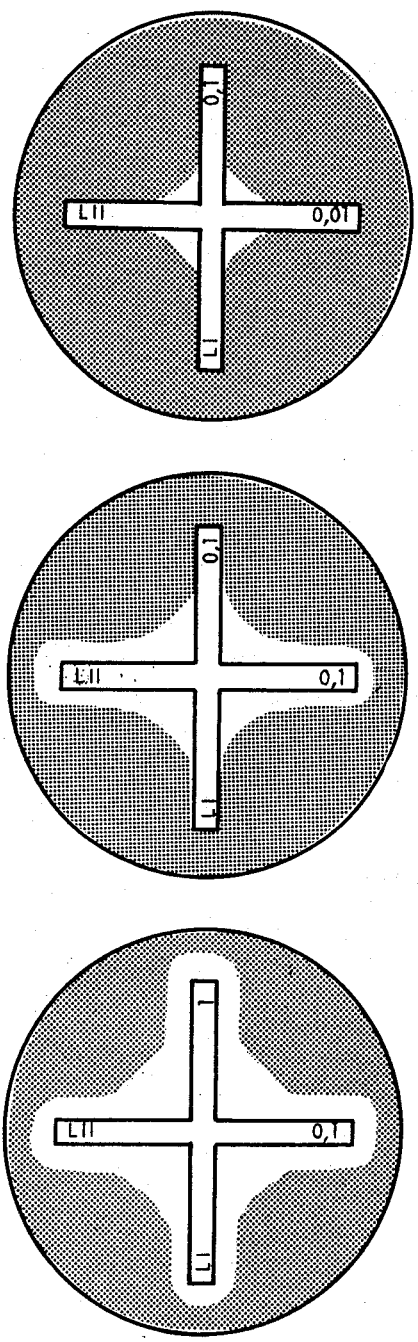

The simultaneous use of lankavacidin and lankavamycin yields better antibacterial effects both in vitro and in vivo than the effects produced by the components alone. The synergistic effect is shown, for example, on agar plates inoculated with Staphylococci on which strips of filter paper impregnated with solutions of lankavacidin and lankavamycin are laid. FIG. 3 shows a cross-strip test against *Staphylococcus aureus* with lankavamycin (L') and lankavacidin (L'') in different concentrations (mg./cc.) which are given at the righthand side and lower strip-end respectively. The concentrations of 0.1 mg./cc. of lankavamycin alone or of 0.01 mg./cc. of lankavacidin alone are ineffective.

In vivo the dose which protects mice infected with Staphylococci is 10 mg./kg. of lankavacidin+100 mg./kg. of lankavamycin applied subcutaneously, i.e., a dose which is not effective when the individual components are used alone.

An object of the present invention, apart from the methods of preparing the antibiotics lankavamycin and lankavacidin is also formed by the said compounds themselves and, furthermore, the transformation products obtained by means of hydrogenation or oxidation and the fission products as obtained, for example, in the hydrolysis of lankavamycin and/or lankavacidin.

The antibiotics lankavamycin and/or lankavacidin, the above-mentioned transformation and fission products or suitable mixtures may be employed as medicaments, for example in the form of pharmaceutical preparations. These preparations contain the said compounds in admixture with a pharmaceutical organic or inorganic carrier suitable for enteral, parenteral or local administration. For making the carrier there are used substances which do not react with the new compounds, such as, for example, gelatine, lactose, starch, magnesium stearate, talc, vegetable oils, benzyl alcohols, gums, polyalkylene glycols, white petroleum jelly, cholesterol or other known carriers for medicaments. The pharmaceutical preparations may be in the form, for example, of tablets, dragees, powders, salves, creams, suppositories or in liquid form as solutions, suspensions or emulsions. If desired, they are sterilized and/or contain auxiliary substances, such as preserving, stabilizing, wetting or emulsifying agents. They may also contain other therapeutically valuable substances.

The invention is illustrated in the following examples, but no limitation of the object of the invention is thereby intended. The temperatures are given in degrees centigrade.

*Example 1*

A nutrient solution of the following composition is prepared: 20 grams of distillers' solubles, 20 grams of lactose, 1 gram of sodium nitrate, 5 grams of sodium chloride and 1 liter of tap water, and the solution is adjusted to a pH value of 7.5. This solution, or a multiple thereof, is emplited into 500 cc. Erlenmeyer flasks (each contains 100 cc. of nutrient solution) or into 500 liter fermenters (each contains 300 liters of nutrient solution) and sterilized for 29–30 minutes under 1 atmosphere gauge pressure. Inoculation is then carried out with up to 10% of a partially sporulating vegetable culture of Streptomyces strain NRRL 2834 and incubation is carried out while shaking or stirring well at 27° C., cultures in fermenters being aerated (with about 1 volume of sterile air per volume of nutrient solution per minute). After 70–120 hours of growth, the cultures are filtered—a filtration assistant being added—through a suction filter or a filter press or a rotating filter and the antibiotically active aqueous solution is thus freed from the mycelium and other solid constituents.

*Example 2*

If the nutrient solutions (a) to (f) described hereunder are employed, for example, instead of the medium indicated in Example 1, aqueous antibiotically active solutions are obtained after similarly performed sterilization, inoculation with Streptomyces strain NRRL 2834, incubation at 27° C. and filtration:

(a) 20 grams of mannitol, 20 grams of distillers' solubles, 1 gram of sodium nitrate, 3 grams of sodium chloride and 1 liter of tap water; the pH value before sterilization is 7.3.

(b) 20 grams of malt extract, 20 grams of distillers' solubles, 1 gram of sodium nitrate, 5 grams of sodium chloride and 1 liter of tap water; the pH value before sterilization is 7.8.

(c) 10 grams of crude glucose, 10 grams of distillers' solubles, 1 gram of sodium nitrate, 1 gram of sodium chloride, 10 grams of calcium carbonate and 1 liter of tap water; the pH value before sterilization is 7.5.

(d) 5 grams of distillers' solubles, 40 grams of soya bean meal, 20 grams of crude glucose, 20 grams of sodium chloride, 10 grams of calcium carbonate and 1 liter of tap water; the pH value before sterilization is 7.5.

(e) 20 grams of malt extract, 20 grams of corn steep liquor, 5 grams of sodium chloride, 0.2 gram of secondary potassium phosphate, 20 grams of calcium carbonate and 1 liter of tap water; the pH value before sterilization is 7.5.

(f) 20 grams of mannitol, 20 grams of soya bean meal and 1 liter of tap water; the pH value before sterilization is 7.3.

*Example 3*

The filtration residue of a 150 liter mixture obtained as described in Example 1 or 2 is thoroughly stirred with 25 liters of acetone and filtered again. This process is repeated twice, whereupon the mould-active acetone solutions are combined and concentrated in vacuo to dryness. After treatment with acetic ester, the mould-active substance is obtained in the form of a brownish powder which shows the following absorption bands in the ultra-violet spectrum:

360 m$\mu$ (log $E_{1\,cm.}^{1\%}$=2.71), 342 m$\mu$ (log $E_{1\,cm.}^{1\%}$=2.73), 325 m$\mu$ (log $E_{1\,cm.}^{1\%}$=2.57), and 309 m$\mu$ (log $E_{1\,cm.}^{1\%}$=2.32)

The culture filtrate solution is extracted with 70 liters of ethyl acetate, the entire antibacterial activity being transferred to the organic phase. The extract is washed with water, evaporated in vacuo to 5 liters and then shaken several times with 0.5-n. acetic acid and with 2-n. caustic soda solution. Finally, the ethyl acetate solution is dried over sodium sulfate and concentrated in vacuo, an oily residue being obtained. By treating with petroleum ether a powder is obtained which consists of a crude mixture of lankavamycin and lankavacidin.

*Example 4*

5.3 grams of the crude mixture obtained as described in Example 3 are dissolved in 100 cc. of absolute chloroform and the solution is added to a column of 150 grams of aluminum oxide (activity III according to Brockmann). 400 cc. of absolute chloroform dissolve out only inactive accompanying substances. Elution is thereafter carried out with 450 cc. of chloroform containing 3% of methyl alcohol, the entire active substance being contained in the eluate. A considerable quantity of brown to black impurities are left adhering in the column. By concentrating the active fractions, 2.75 grams of an enriched mixture of the antibiotics lankavamycin and lankavacidin are obtained in the form of a viscous pale brownish oil.

*Example 5*

2.75 grams of the mixture enriched as described in Example 4 are subjected to a 100-stage counter-current distribution, the following solvent mixture being employed: 3 parts by volume of carbon tetrachloride, 2 parts by volume of chloroform, 4 parts by volume of methanol and 1 part by volume of water. The individual fractions are tested for their antibacterial activity. *Bacillus subtilis* and *Micrococcus pyogenes*, var. *aureus* being used as test organisms. With the first test organism, an activity maximum is obtained in stage 27 (antibiotic lankavamycin) whereas with the second test organism an activity maximum is observed in stage 80 (antibiotic lankavacidin). Stages 20–37, on the one hand, and stages 70–91, on the other hand, are thereupon combined and are worked up separately in the following manner: After the separation of the lower phase, the upper phase is diluted with water and shaken three times with fresh chloroform. These extracts are combined with the separated lower phase and the solution is dried over sodium sulfate and evaporated in vacuo. In this way, lankavamycin and lankavacidin are obtained in homogeneous form.

*Example 6*

9.63 grams of the antibiotic lankavamycin obtained as described in Example 5 are chromatographed on a column of 200 grams of aluminum oxide (activity III according to Brockmann). The portions eluted with 800 cc. of benzene are inactive and are rejected. 400 cc. of chloroform, which has been completely freed from alcohol by distillation over phosphoric anhydride, dissolve out 2.0 grams of a pale brownish, honey-like substance of medium activity. By further elution with 300 cc. of chloroform-methyl alcohol in the ratio of 99:1, the bulk of the antibiotic is recovered as a white amorphous powder (5.5 grams). The further eluates contain only small amounts of activity.

4.0 grams of the main fractions are dissolved in a little acetone and this solution is diluted with five times the amount of ether. The solution is now concentrated and the evaporated solvent is gradually replaced by petroleum ether. On standing in the cold state, the antibiotic lankavamycin crystallizes out in irregular thick crystals. The colorless crystals are not sublimable at 130° C. in a high vacuum. The antibiotic cannot be extracted from a solution in ethyl acetate either with dilute acetic acid or with dilute sodium carbonate. A preparation recrystallized four times and dried for 20 hours in a high vacuum at 80° C. exhibits the following properties: Melting point, 147–150° C.; on further heating long needles grow out of the fused mass and finally melt at 181–182° C.; $[\alpha]_D^{20} = -93.8°$ (c.=1.23 in fine spirit); elementary analysis: C 60.18%, H 8.75%, O 31.06%, $CH_3CO$ 11.49%, $CH_3$—(C) 20.54%, $OCH_3$ 8.67%.

A solution of the antibiotic of 0.25% strength in optically pure fine spirit shows an absorption maximum at 289 m$\mu$ (log $\epsilon$=1.50). In the infra red spectrum, taken in potassium bromide (see FIG. 1), bands are visible, inter alia, at the following wave lengths: 2.88$\mu$, 3.36$\mu$, 3.40$\mu$, 5.73$\mu$, 6.12$\mu$, 6.68$\mu$, 6.87$\mu$, 7.02$\mu$, 7.27$\mu$, 7.49$\mu$, 8.12$\mu$, 8.58$\mu$, 8.73$\mu$, 9.12$\mu$, 9.32$\mu$, 9.45$\mu$, 9.98$\mu$, 10.28$\mu$, 10.65$\mu$, 10.88$\mu$, 11.08$\mu$, 11.45$\mu$, 12.47$\mu$, 13.30$\mu$, and 14.45$\mu$.

On hydrolysis of lankavamycin with 0.5-n. sulfuric acid (1 hour, 100° C.), a reducing sugar is split off which in paper chromatography in the system n-butanol-glacial acetic acid-water (4:1:1) shows an Rf value of 0.68.

If lankavamycin is treated with alkali, acetic acid is produced, as can be proved by paper chromatography and by the mixed melting point and infra red absorption spectrum of the crystalline p-phenyl-phenacyl ester (melting point 112.5–114° C.).

A solution of lankavamycin in oxidation resistant acetone is not affected by an aqueous potassium permanganate solution of 5% strength at room temperature for several hours. At 95° C., on the other hand, rapid precipitation of manganese takes place.

*Example 7*

600 mg. of the antibiotic lankavacidin obtained as described in Example 5 are chromatographed for further purification on a column of 15 grams of aluminum oxide, elution being carried out with chloroform and chloroform-methanol mixtures. The whole of the activity is contained in the fractions which are eluted with chloroform-methanol in the ratios of 99:1 and 49:1. The active fractions, on being concentrated in vacuo, give 280 mg. of a yellowish oil which solidifies partially in crystalline form. By crystallization from a little ethyl acetate, the antibiotic can be recovered as a pale cream-colored crystal powder. Yield about 90 mg. The mother liquors are almost as active as the crystals and solidify partially on standing.

The antibiotic lankavacidin melts at 165–168° C. after recrystallization from a mixture of ethyl acetate and ether. Elementary analysis gives the following values: C=62.71%, H=7.11%, N=2.87%, (C)$CH_3$=12.60%. $[\alpha]_D^{20} = -161°$ (c.=0.967 in absolute ethanol). With alcoholic ferric chloride solution of 5% strength a green color reaction is obtained.

The ultra-violet absorption spectrum in fine spirit shows a maximum at 227 m$\mu$ (log $E_{1 cm.}^{1\%} = 2.95$)

In the infra red spectrum (taken in potassium bromide, see FIG. 2), bands are visible, inter alia, at the following wave lengths: 2.93$\mu$, 3.39$\mu$, 5.71$\mu$, 5.84$\mu$, 5.92$\mu$, 6.58$\mu$, 6.89$\mu$, 7.38$\mu$, 7.92$\mu$, 8.18$\mu$, 8.59$\mu$, 8.79$\mu$, 9.07$\mu$, 9.40$\mu$, 9.87$\mu$, 10.34$\mu$, 11.46$\mu$, 12.03$\mu$, 13.36$\mu$ and 14.31$\mu$.

5 mg. of lankavacidin are hydrolyzed overnight in 1 cc. of 6-n. hydrochloric acid at 110° C. Testing of the hydrolyzate by paper chromatography shows that no ninhydrin-positive substances are present.

What is claimed is:

1. Process for the manufacture of a member of the group consisting of the antibiotic substances lankavamycin and lankavacidin and mixtures thereof, wherein *Streptomyces violaceo-niger* NRRL 2834 is cultivated in an aqueous nutrient solution containing inorganic salts, a source of carbon and nitrogen, under aerobic conditions, until the nutrient solution shows a substantial antibacterial action, and the antibiotic substances then isolated.

2. Process as claimed in claim 1, wherein cultivation takes place under immersed conditions for 36 to 120 hours at a temperature between 18 and 40° C.

3. Process as claimed in claim 1, wherein the antibiotic substances are extracted from the culture filtrate with ethyl acetate.

4. Process as claimed in claim 1, wherein the antibiotic substances are purified by adsorption on aluminum oxide and eluted from the adsorbate with a mixture of chloroform and methanol.

5. Process as claimed in claim 1, wherein the mixture of the antibiotic substances is separated into the compounds by counter-current distribution in the system carbon tetrachloride-chloroform-methanol-water.

6. Process as claimed in claim 1, wherein the antibiotic substances are purified by chromatography on aluminum oxide.

7. The antibotic lankavamycin, a colorless crystalline substance, soluble in alcohol, acetone, chloroform, acetic ester, ether and benzene and only difficulty soluble in water and petroleum ether, showing a double melting point, at 147–150° C. and at 181–182° C., having the optical rotation $[\alpha]_D^{20} = -93.8°$ (c.=1.23, in ethanol), giving in elementary analysis the following values: C=60.18%, H=8.75%, O=31.06%, $CH_3CO$=11.49%, $OCH_3$=8.67%, (C)$CH_3$=20.54%, having a molecular weight of about 890, exhibiting in the ultra-violet absorption spectrum a maximum at 289m$\mu$ (log E=1.50) and in the infra red spectrum in potassium bromide bands at 2.88$\mu$, 3.36$\mu$, 3.40$\mu$, 5.73$\mu$, 6.12$\mu$, 6.68$\mu$, 6.87$\mu$, 7.02$\mu$, 7.27$\mu$, 7.49$\mu$, 8.12$\mu$, 8.58$\mu$, 8.73$\mu$, 9.12$\mu$, 9.32$\mu$, 9.45$\mu$, $9.98\mu$, $10.28\mu$, $10.65\mu$, $10.88\mu$, $11.08\mu$, $11.45\mu$, $12.47\mu$, $13.30\mu$ and $14.45\mu$, yielding on hydrolysis with dilute mineral acid a reducing sugar and on treatment with alkali acetic acid, giving a deep blue color reaction according to Keller-Kiliani.

8. The antibiotic lankavacidin forming pale yellow crystals melting at 165–168° C. having the optical rotation $[\alpha]_D^{20} = -161°$ (c.=0.967, in ethanol), soluble in alcohol, acetone, chloroform and acetic ester and being difficulty soluble in petroleum ether and water, giving a green color reaction with ferric chloride solution, showing in elementary analysis the following values:

C=62.71%, H=7.11%, N=2.87%, (C)CH$_3$=12.60% having a molecular weight of about 460 exhibiting in the ultra-violet absorption spectrum a maximum at $$227 \text{ m}\mu \text{ (log } E_{1\text{ cm.}}^{1\%} = 2.95)$$

and in the infra-red spectrum in potassium bromide bands at $2.93\mu$, $3.39\mu$, $5.71\mu$, $5.84\mu$, $5.92\mu$, $6.58\mu$, $6.89\mu$, $7.38\mu$, $7.92\mu$, $8.18\mu$, $8.59\mu$, $8.79\mu$, $9.07\mu$, $9.40\mu$, $9.87\mu$, $10.34\mu$, $11.46\mu$, $12.03\mu$, $13.36\mu$, and $14.31\mu$ and yielding no ninhydrin-positive substances on hydrolysis with strong acids.

No references cited.